United States Patent
Wang et al.

(10) Patent No.: US 6,741,357 B2
(45) Date of Patent: May 25, 2004

(54) QUADRATURE PHASE SHIFT INTERFEROMETER WITH UNWRAPPING OF PHASE

(75) Inventors: Jianmin Wang, Fremont, CA (US); Jason L. Pressesky, Menlo Park, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 223 days.

(21) Appl. No.: 10/000,001

(22) Filed: Oct. 24, 2001

(65) Prior Publication Data

US 2003/0035113 A1 Feb. 20, 2003

Related U.S. Application Data

(60) Provisional application No. 60/312,152, filed on Aug. 14, 2001.

(51) Int. Cl.[7] .................................. G01B 9/07
(52) U.S. Cl. ........................ 356/493; 356/495
(58) Field of Search ..................... 356/491, 492, 356/493, 494, 495

(56) References Cited

U.S. PATENT DOCUMENTS 4,019,818 A * 4/1977 Vilkomerson ............. 356/493
5,710,631 A * 1/1998 Bou-Ghannam et al. .... 356/495
5,999,261 A    12/1999 Pressesky et al.

OTHER PUBLICATIONS

Chris L. Koliopoulous, "Simultaneous phase shift interferometer", Advanced Optical Manufacturing and Testing II, Proc. SPIE vol. 1531, pp. 119–127 (1991).

Jianmin Wang and Ian Grant, "ESPI, Phase mapping, NDT the techniques applied to real–time, thermal loading", Appl. Opt. 34, 3620–3627.

* cited by examiner

Primary Examiner—Samuel A. Turner
Assistant Examiner—Patrick Connolly
(74) Attorney, Agent, or Firm—Moser, Patterson & Sheridan LLP

(57) ABSTRACT

A method and apparatus for interferometric measurement of a medium surface is disclosed. More particularly, a quadrature phase shift interferometer and a process for unwrapping phase are described. The interferometer has a reduced number of optical components though yields results sufficient to measure surface of a hard disc for final inspection. Defects on such a surface are characterized by their out-of-plane displacement with nanometer resolution.

15 Claims, 4 Drawing Sheets

US 6,741,357 B2

QUADRATURE PHASE SHIFT INTERFEROMETER WITH UNWRAPPING OF PHASE

CROSS-REFERENCE TO RELATED APPLICATIONS

This application claims benefit of U.S. provisional Patent Application, application No. 60/312,152, filed Aug. 14, 2001, which is incorporated by reference herein in its entirety.

FIELD OF THE INVENTION

The present invention generally relates to interferometry, and more particularly to a quadrature phase shift interferometer.

BACKGROUND OF THE INVENTION

A form of an information storage and retrieval device is a hard disc drive [hereinafter "disc drive"]. A disc drive is conventionally used for information storage and retrieval with computers, data recorders, redundant arrays of independent discs (RAIDs), multi-media recorders, and the like. A disc drive comprises one or more disc media.

Each disc medium comprises a substrate upon which materials are deposited to provide a magnetically sensitive surface. In forming a disc medium, a substrate is ground or polished, conventionally by chemical-mechanical or mechanical polishing, to provide a substantially planar surface. Layers of materials are substantially uniformly deposited on this substantially planar surface to provide magnetic properties for writing to and reading from the disc media.

However, defects, such as pits, voids, particles, bumps, and scratches, among others may arise on a disc medium surface. These defects need to be detected and characterized. Interferometers can be used to detect and characterize such defects. Displacement demodulation is conventionally done by counting fringes or demodulating phase. However, such interferometers have a relatively large number of optical-components, as may be seen in U.S. Pat. No. 5,999,261.

Accordingly, it would be desirable to provide a method and apparatus for interferometry with a relatively small number of optical components to reduce optical path variation due to air turbulence, as well as to reduce energy loss due to ghost images reflected from optical component surfaces. Moreover, by providing an interferometer with a relatively small number of optical components, stability and immunity to thermal expansion and environmental vibration may be enhanced while cost is reduced.

SUMMARY OF THE INVENTION

The present invention provides method and apparatus for inspecting a disc medium surface. More particularly, a quadrature phase shift interferometer designed to provide an optical, non-contact testing method for inspecting a disc medium surface, or other surface, is described. Defects are detected and characterized by out-of-plane displacement. The interferometer described is able to measure out-of-plane displacements with nanometer resolution with frequency response in a range of DC to hundreds of mega hertz depending on detector rise time. Such an interferometer comprises fewer optical components as compared with prior art interferometers of at least equivalent capability.

An aspect of the present invention is an interferometer for disc surface inspection. The interferometer comprises a laser configured to provide a linearly polarized laser beam, and a variable ratio beam splitter positioned to receive the linearly polarized laser beam and configured to split the linearly polarized laser beam into a reference beam and an object beam. The reference beam and the object beam are polarized beams with polarizations orthogonal to one another. A mirror is positioned to reflect the reference beam back toward the variable ratio beam splitter to provide a reflected reference beam. The disc surface is positioned to reflect of the object beam back toward the variable ratio beam splitter to provide a reflected object beam. The variable ratio beam splitter is positioned to receive the reflected reference beam and the reflected object beam, and configured to combine the reflected reference beam and the reflected object beam to provide a combinative beam. A nonpolarizing beam splitter is positioned to receive the combinative beam and configured to split the combinative beam into a first output beam and a second output beam. An adjustable quarter-wave plate is positioned to receive the first output beam and configured to introduce a phase shift between the reflected object beam portion of the first output beam and the reflected reference beam portion of the first output beam to provide a phase-shifted output beam. A first polarizer is positioned to receive the phase-shifted output beam and configured to assemble the phase-shifted output beam along a predetermined direction to provide[d] a first assembled beam. A second polarizer is positioned to receive the second output beam and configured to assemble the second output beam along the predetermined direction to provide a second assembled beam. A first optical detector is positioned to receive the first assembled beam and configured to provide a first voltage proportional to change in intensity due to interference of the reflected object beam portion and the reflected reference beam portion of the first assembled beam, and a second optical detector is positioned to receive the second assembled beam and configured to provide a second voltage proportional to change in intensity due to interference of the reflected object beam portion and the reflected reference beam portion of the second assembled beam.

An aspect of the present invention is a method for media surface inspection. The method comprises of providing a linearly polarized laser beam. The linearly polarized laser beam is split into a reference beam and an object beam based on polarization. The reference beam is reflected from a mirrored surface to provide a reflected reference beam. The object beam is reflected from the medium surface to provide a reflected object beam. The reflected reference beam and the reflected object beam are combined to provide a combinative beam. The combinative beam is split into a first output beam and a second output beam based on amplitude. A phase-shift is introduced between the reflected object beam portion and the reflected reference beam portion of the first output beam to provide a phase-shifted output beam. The phase-shifted output beam is assembled at an angle with respect to direction of polarization to provide a first assembled beam. The second output beam is assembled at the angle to provide a second assembled beam. Fringes of the first assembled beam are detected to provide a first voltage, and fringes of the second assembled beam are detected to provide a second voltage.

Another aspect of the present invention is a method for inspection of a disc medium surface. The method comprises determining a first intensity for a first beam voltage, determining a second intensity for a second beam voltage, determining a first phase angle for the first intensity, determining a second phase angle for the second intensity, adding positive and negative values of a constant to the first phase angle and the second phase angle in response to slope direction of the first phase angle and the second phase angle to provide a phase function, and determining displacement caused by variations in the disc media surface.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

While foregoing is directed or the preferred embodiment of ihe present invention, other and further embodiments of the invention may be devised without departing from the basic scope thereof, and the scope thereof is determined by the claims that follow.

DETAILED DESCRIPTION OF THE DRAWINGS

Figure 1:
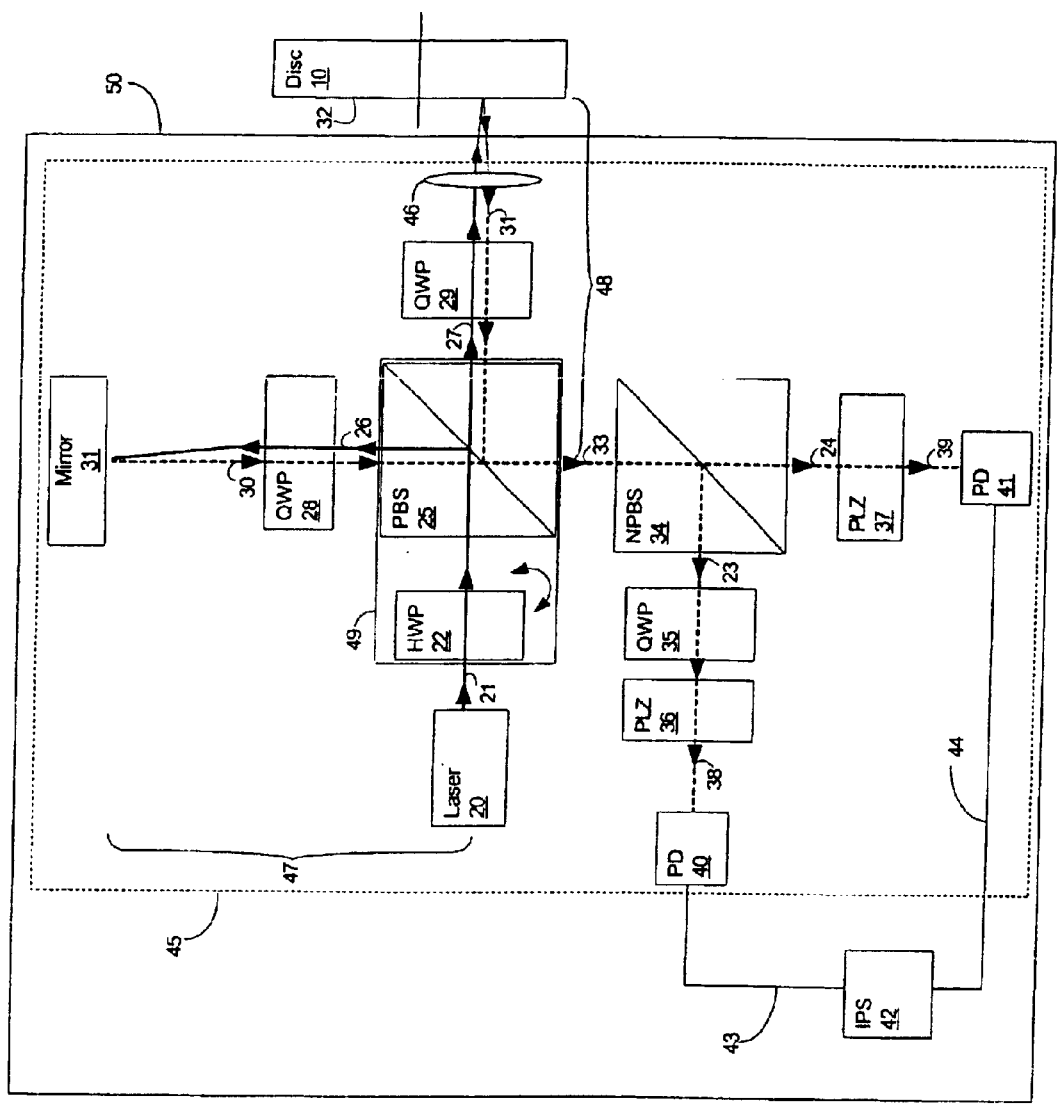
FIG. 1 is an optical layout of an exemplary portion of an embodiment of an interferometer in accordance with one or more aspects of the present invention.

FIG. 1 is an optical layout of an exemplary portion of an embodiment of an interferometer system 50 in accordance with one or more aspects of the present invention. As will be understood, interferometer system 50, or more particularly quadrature phase shift interferometer 45, uses two polarization processes to create two independent interference signals, which are phase shifted with respect to one another. The presence of two independent signals in phase quadrature facilitates unwrapping of phase.

With continuing reference to FIG. 1, laser or laser beam source 20 is configured to provide a laser or other optical energy beam 21. Laser 20 may be configured to provide a linearly polarized laser beam. For example, a Helium-Neon (He—Ne) laser may be used, though it should be understood that the present invention may be used with known lasers of other wavelengths. Laser beam 21 is a linearly polarized laser beam. Laser beam 21 is provided to variable ratio beam splitter 49.

Variable ratio beam splitter 49 comprises a polarizing beam splitter (PBS) 25 and half-wave plate (HWP) 22. Notably, half-wave plate 22 is configured to rotate. By rotating half-wave plate 22, relative intensity or amplitude of reference beam 26 and object beam 27 may be adjusted. Half-wave plate 22 is used to rotate direction of polarization of laser beam 21 with respect to polarizing beam splitter 25. In other words, direction of orientation is adjusted such that polarizing beam splitter receives components of s-polarization and p-polarization. Laser beam 21 is provided to half-wave plate 22 and then to polarizing beam splitter 25. Polarizing beam splitter 25 splits laser beam 21 into a reference beam 26 and an object or measurement beam 27 according to s-polarization and p-polarization components. An aspect of the present invention is to balance intensity of reference beam 26 and object beam 27. Alternatively, half-wave plate 22 may be removed and direction of polarization controlled by rotation of laser 20.

Reference beam 26 and object beam 27 are polarized beams with polarizations perpendicular or orthogonal to one another. Thus, reference beam 26 may comprise only the s-polarized component of laser beam 21 and object beam 27 may comprise only the p-polarized component. Notably, reference beam 26 and object beam 27 are interchangeable.

Reference beam 26 is provided to quarter-wave plate (QWP) 28 and then to mirror 31. Reference beam 26 enters a passive side of quarter-wave plate 28. Reference beam 26 is reflected off an optically reflective surface of mirror 31 to provide reflected reference beam 30, as shown with a dashed line. For purposes of clarity, beams post-reflection and pre-recombination are shown with a dashed line.

Reflected reference beam 30 is provided to quarter-wave plate 28. Quarter-wave plate 28, as well as quarter waveplate 29, are used to reduce power loss due to subsequent combination of reflected reference beam 30 and reflected object beam 31, respectively. Reference beam 26 immediately prior to passing through quarter-wave plate 28 comprises only linear polarization, namely s-polarization, components. After passing through quarter-wave plate 28, reference beam 26 linear polarization components are converted to circular polarization components. Reflected reference beam 30 immediately prior to passing through quarter-wave plate 28 comprises only circular polarization components. After passing through quarter-wave plate 28, reflected reference beam 30 circular polarization components are converted to linear polarization, namely p-polarization, components, and thus reflected reference beam with p-polarization components passes straight through polarizing beam splitter 25 for providing a portion of combinative beam 33.

Object beam 27 is provided to a passive side of quarter-wave plate 29 and then to lens 46. Lens 46 is used to reduce spot size of object beam 27 for imaging off of surface 32 of disc medium 10. Spot size determines resolution for inspection purposes, and thus a smaller spot size allows smaller defects to be resolved. Focused object beam 27 from lens 46 leaves interferometer system 50 and then is reflected from surface 32 to re-enter interferometer system 50 back to lens 46, where it is reset to approximately the same spot size prior to focusing. Disc 10 is a moving, such as rotating, target. From lens 46, reflected object beam 31 is provided to quarter-wave plate 29. Object beam 27 immediately prior to passing through quarter-wave plate 29 comprises oniy p-polarization components. After passing through quarter-wave plate 29, object beam 27 comprises only circular polarization components. Reflected object beam 31 immediately prior to passing through quarter-wave plate 29 comprises only circular polarization components. After passing through quarter-wave plate 29, reflected object beam 31 comprises only s-polarization components, and thus as reflected object beam 31 enters from a side opposite to that of original entry to polarizing beam splitter 25, it is orthogonally diverted by polarizing beam splitter 25 in a direction opposite to that of reference beam 26 for providing a portion of combinative beam 33.

Notably difference in optical path length 48 and optical path length 47 is less than laser beam coherence length. Furthermore, it should be understood that surface defects on surface 32 causes displacement in optical path length 48. For example depending on reference level, a depression lengthens optical path length 48, both with respect to object beam 27 and reflected object beam 31, while a bump shortens optical path length 48. Maximum allowed displacement is limited by focus depth of lens 46. Optical path length 48 is modulated by surface 32, if surface 32 is moving. Optical path length 48 is modulated by out-of-plane, or more particularly out-of-reference plane, movement of surface 32.

Reflected reference beam 30 and reflected object beam 31 are combined by polarizing beam splitter 25 to provide combinative beam 33. Combinative beam 33 comprises a reflected reference beam portion and a reflective object beam portion, as respective polarization directions of these portions are orthogonal. In other words, the reflected reference beam portion and the reflective object beam portion in combinative beam 33 do not interfere with one another.

Combinatve beam 33 is provided from polarizing beam splitter 25 to non-polarizing beam splitter 34 (NPBS). Non-polarizing beam splitter 34 amplitude splits combinative beam 33 into output beam 23 and output beam 24.

One of output beam 23 or 24 is provided to a quarter-wave plate. In the embodiment shown in FIG. 1, output beam 23 is provided to quarter-wave plate 35. Quarter-wave plate 35 introduces a phase shift between reflected reference and reflected object beam portions or components of output beam 23. Quarter-wave plate may be adjustable. Thus, for example, quarter-wave plate 35 could be adjusted, as needed, to introduce a target phase shift, for example approximately 90 degrees, between reflected reference and reflected object beam components of output beam 23. As described in more detail below, because two waves phase shifted with respect to one another are used, unwrapping of phase is facilitated. Such a phase shift is used for providing a quadrature output, as stated above. However, if outputs were viewed only in parallel, then quarter-wave plate 35 may be omitted. Notably, reflected reference and reflected object beam components of output beam 23, or output beam 24 for that matter, are still orthogonally polarized with respect to one another.

Polarizer 36 receives phase-shifted output beam 23 and assembles its reflected reference and reflected object beam components along a predetermined direction. for example approximately 45 degrees, to the vertical and horizontal axes of polarization of such components to provide assembled beam 38. As mentioned above HWP 22 is used to balance the beams, but if such beams were out of balance, a predetermined direction or angle may be selected or adjusted to enhance contrast of the interference. So, if reflected object and reference beam components are out of balance, then another angle may be selected to enhance the contrast by equalizing contributions of each such component in assembly of assembled beam 38. Assembled beam 38 may have interference between assembled reflected reference and reflected object beam components in response to displacement in optical path length 48 caused by surface defects or other surface inconsistencies, or from a nominal surface condition depending on reference plane selection, as mentioned above.

Polarizer 37 receives output beam 24 and assembles its reflected reference and reflected object beam components along a predetermined direction, for example approximately 45 degrees, to the vertical and horizontal axes of polarization of such components to provideassembled beam 39. Assembled beam 39 may have interference between assembled reflected reference and reflected object beam components in response to displacement in optical path length 48 caused by surface defects or other surface inconsistendes, or from a nominal surface condition, as mentioned above.

Assuming surface defects exist and are detected, reflected reference and reflected object beam components interfere in assmbled beams 38 and 39 to produce moving fringes representing modulation of optical path length 48. Such moving fringes, which are temporal variation in light intensity, may be observed in both output beams 38 and 39 in parallel. Alternatively, such moving fringes may be observed in both assembled beams 38 and 39 in parallel and in phase quadrature, as described in more detail in U.S. Pat. No. 5,999,261.

Assembled beamns 38 and 39 are provided to optical detectors 40 and 41, respectively. Optical detectors 40 and 41 maybe photodiode detectors. Detectors 40 and 41 operate at a speed sufficient to capture fringes from assembled beams 38 and 39 and deliver respective voltages proportional tox temporal light intensity change as signals 43 and 44, respectively, for subsequent digital signal processing by information processing sytem (IPS) 42.

Figure 2:
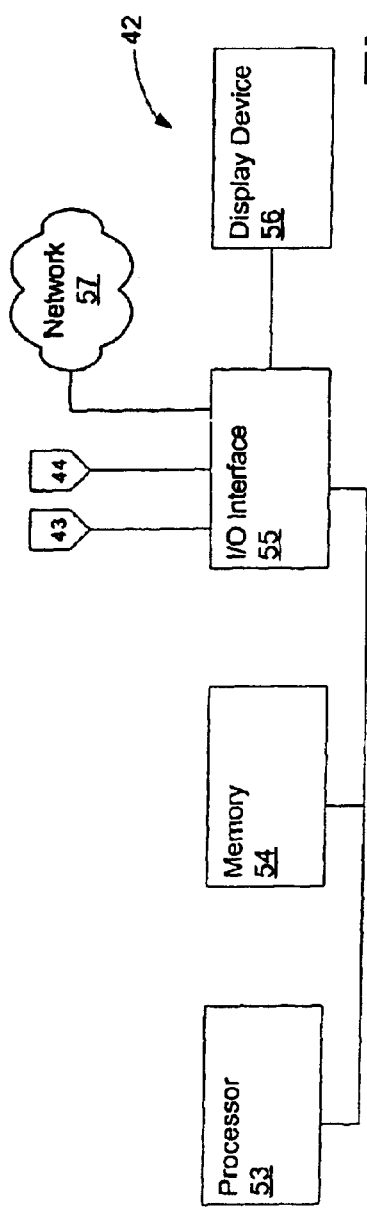
FIG. 2 is a block diagram of an exemplary portion of an embodiment of an information processing system configured to receive light intensity voltage signals in accordance with one or more aspects of the present invention.

Referring to FIG. 2, there is shown a block diagram of an exemplary portion of an embodiment of an information processing system 42 configured to receive light intensity voltage signals 43 and 44 in accordance with one or more aspects of the present invention. Information processing system comprises processor 53, memory 54, input/output interface 55 and display device 56. Information processing system 42 may be a programmed personal computer or a digital oscilloscope or other known device for processing signals of the form of signals 43 and 44.

Signals 43 and 44, as mentioned above, represent temporal interference fringes formed in response to temporal phase difference, Ø, between reflected reference beam 30 and reflected object beams 31. Temporal phase difference or phase, Ø, is a function of object displacement, d, namely displacement caused by disc medium surface 32. This relationship may be expressed as, $$[Ø=(2nd)/\lambda]Ø=(4nd)/\lambda \qquad (1)$$

where wavelength, $\lambda$, is wavelength of laser beam 21. Notice that if displacement, d, equals 0, then phase Ø equals 0, or in other words disc medium surface 32 is flat, which may be taken as a reference location. However, it is not necessary to take the flat or unaffected portion of a disc media surface 32 as a reference location or plane. Accordingly, it should be understood that displacement, d, is a value depending on a reference location. Thus, displacement d is actually a change in displacement, $\Delta d$, with respect to such a reference location. Likewise, phase, Ø, is actually a change is phase, $\Delta[\ ]Ø$, due to change in displacement.

Assuming interferometer system 50 is properly aligned and adjusted, intensity I received at optical detector 40 and intensity Q received at optical detector 41 may be represented as, $$[I=Ia+Ib\cos(\emptyset)]I=I_a+I_b\cos(\emptyset) \qquad (2A)$$

$$[Q=Qa-Qb\sin(\emptyset)]Q=Q_a-Q_b\sin(\emptyset) \qquad (2B)$$

where, $$[Ia=(I\max+I\min)/2]I_a=(I_{max}+I_{min})/2 \qquad (3A)$$

$$[Ib=(I\max-I\min)/2]I_b=(I_{max}-I_{min})/2 \qquad (3B)$$

$$[Qa=(Q\max+Q\min)/2]Q_a=(Q_{max}+Q_{min})/2 \qquad (3C)$$

$$[Qb=(Q\max-Q\min)/2]Q_b=(Q_{max}-Q_{min})/2 \qquad (3D)$$

where [Imax and imin] $I_{max}$ and $I_{min}$ are the maximum and minimum intensities of the I beam, namely assembled beam 38, over a time period and where [Qmax and Qmin] $Q_{max}$ and $Q_{min}$ are the maximum and minimum intensities of the Q beam, namely assembled beam 39, over the time period. Conventionally, the time period for obtaining accurate maximum and minimum intensities is in the range of approximately 10 to 20 cycles of the I or Q beam.

Because phase angle is used as the argument for a sine and a cosine function as in Equations (2A) and (2B) [collectively "Equations (2)"], phase wrapping occurs. In other words, phase wraps around to the same value for every 2n increase or decrease. To obtain the actual phase in Equation (1), phase from Equations (2) must be unwrapped. However, because phase Ø directly resolved from Equations (2) yield the principal value of phase, the first step of unwrapping phase is to calculate the phase angle and extend it into a 0 to 2n phase range. To calculate phase angle in a 0 to 2n phase range, phase is calculated according to rules or boundary conditions of Equations (4A) and (4B) for phase angle of assembled beam 38, $$\emptyset=\cos^{-1}[-1][(I-I_a[a])/I_b[b]] \text{ for } Q-Q_a[a]0 \qquad (4A)$$

$$\emptyset=2n-\cos^{-1}[-1][(I-I_a[a])/I_b[b]] \text{ for } Q-Q_a[a]>0 \qquad (4B)$$

and Equations (5A), (5B) and (5C) for phase angle of assembled beam 39, $$\emptyset=\sin^{-1}[-1][(Q_a[a]-Q)/Q_b[b]] \text{ for } I-I_a[a]0 \text{ and } Q-Q_a[a]0 \qquad (5A)$$

$$\emptyset=n-\sin^{-1}[-1][(Q_a[a]-Q)/Q_b[b]] \text{ for } I-I_a[a]<0 \qquad (5B)$$

$$\emptyset=2n+\sin^{-1}[-1][(Q_a[a]-Q)/Q_b[b]] \text{ for } I-I_a[a]0 \text{ and } Q-Q_a[a]>0 (5C)$$

Figure 3:
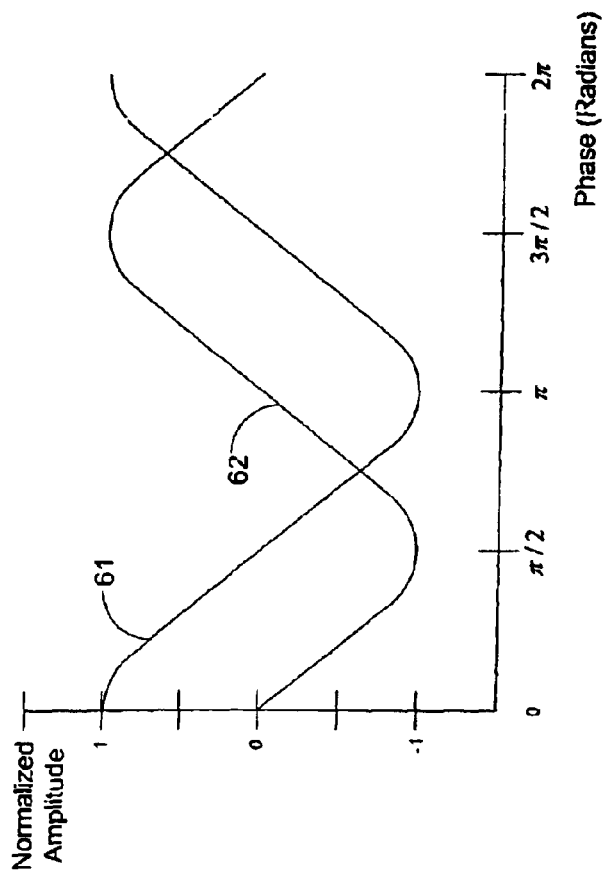
FIG. 3 is a signal graph of an exemplary portion of embodiments of phase versus temporal variation in light intensity normalized waves in accordance with one or more aspects of the present invention.

FIG. 3 is a signal graph of an exemplary portion of embodiments of phase versus I and Q normalized waves 61 and 62, respectively, in accordance with one or more aspects of the present invention. For purposes of clarity, I and Q waves have been normalized to have amplitude of plus or minus one and $I_a[a]=Q_a[a]=0$. From FIG. 3, it may be seen that when Q<0 or Q>0, phase of I wave 61 is only within the range of 0 to n or n to 2n, respectively, namely, respectively Equations (4A) and (4B) [collectively "Equations (4)"] and their respective conditions provide phase angle for I wave 61. Phase angle for Q wave 62 is determined by Equations (5A), (5B), and (5C) [collectively "Equations (5)"] and their respective conditions. When I<0, phase of Q wave 62 is with the range of n/2 to 3n/2, namely, Equation (5B). However, an arbitrary situation occurs while I>0, as phase of Q wave 62 can be either in the range of 0 to n/2 or the range of 3n/2 to 2n. This is resolved by using the value of Q wave 62 as an additional condition. If I>0 and Q<0, phase of Q wave 62 is within the range of 0 to n/2, namely, Equation (5A); and if I>0 and Q>0, phase of Q wave 62 is within the range of 3n/2 to 2n, namely, Equation (5C).

As a practical matter, phase angle resolved from Equations (4) and Equations (5) may not be the same. This is due in part to use of trigonometric functions in Equations (4) and (5), and this is due in part to sensitivity of intensities as a function of phase location, namely, change of phase Ø effect on I and Q. In Equations (4), I is most sensitive to phase change when phase angle is approximately n/2 or 3n/2 and is least sensitive when phase angle is approximately 0 or n. In contrast, in Equations (5), Q is least sensitive to phase change when phase angle is approximately n/2 or 3n/2 and is most sensitive when phase angle is approximately 0 or n. This non-linearity reduces accuracy in phase angle calculation.

To improve accuracy in phase angle calculation, a weighted average of phase angles calculated from Equations (4) and (5) may be used. An example of such a weighted average is, $$\emptyset_{AVG[AVG]}=W(\emptyset)\cdot\emptyset_1[1]+[1-W(\emptyset)]\cdot\emptyset_2[2] \qquad (6)$$

where, $\emptyset_1[1]$ and $\emptyset_2[2]$ are phase angles calculated from Equations (4) and (5), respectively, and where $W(\emptyset)$ is a weight factor. $W(\emptyset)$ is preferably a function of a trigonometric function. For example, $W(\emptyset)$ may be, $$W(\emptyset)=\cos[(\emptyset_1[1]/2)+(\emptyset_2[2]/2)] \qquad (7)$$

Notably, a more complex weight factor than that of Equation (7) may be used, in particular a weight factor derived by experiment based on an actual system set up.

Figure 4:
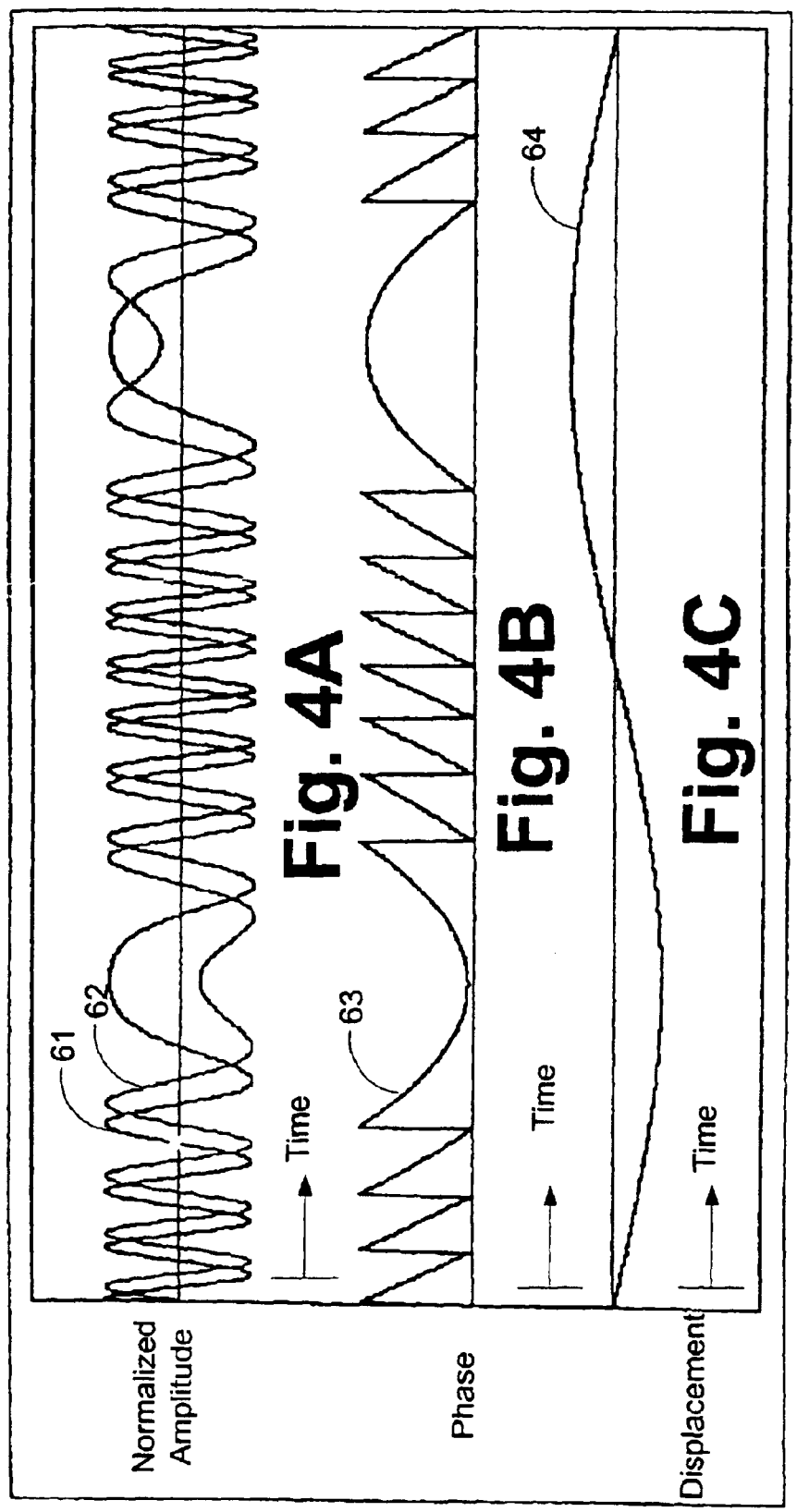
FIG. 4A is a signal graph of an exemplary portion of an embodiment of time versus normalized amplitude of I and Q waves as a function of phase in accordance with one or more aspects of the present invention.
FIG. 4B is a signal graph of an exemplary portion of an embodiment of time versus phase for wrapped phase wave in accordance with one or more aspects of the present invention.
FIG. 4C is a signal graph of an exemplary portion of an embodiment of time versus displacement for unwrapped phase wave in accordance with one or more aspects of the present invention.

Referring to FIG. 4A, there is shown a signal graph of an exemplary portion of an embodiment of time versus normalized amplitude of I and Q waves 61 and 62, respectively, as a function of phase in accordance with one or more aspects of the present invention. This embodiment is for disc run-out of a disc; however, other features of a disc may be measured. I and Q waves of FIG. 4A may be described by Equations (2) using signals 43 and 44 and phase conditions from Equations (4) and (5).

Referring to FIG. 4B, there is shown a signal graph of an exemplary portion of an embodiment of time versus phase for wrapped phase wave 63 in accordance with one or more aspects of the present invention. From I and Q waves of FIG. 4A and from Equations (4) and (5), wrapped phase wave 63 is determined. Results from Equations (4) and (5) are wrapped phase at multiples of 2n, as illustratively shown in FIG. 4B.

Referring to FIG. 4C, there is shown a signal graph of an exemplary portion of an embodiment of time versus displacement for unwrapped phase wave in accordance with one or more aspects of the present invention. Constants of plus or minus 2nn for n a positive number, are added to phase values in wrap regions, such as from FIG. 4B, to form a continuous phase function, namely unwrapped phase wave, which is proportional to displacement wave 64. Sign of 2nn is determined by the direction of phase stepping. If slope of phase from wrapped phase wave 63 of FIG. 4B is positive, then a +2nn is used. If slope of phase from wrapped phase wave 63 of FIG. 4B is negative, then a −2nn is used. In other words, if phase jumps from 0 to 2n, a minus sign applies to 2nn; otherwise, if phase jump is from 2n to 0, a plus sign applies to 2nn. After adding such constants of plus or minus 2nn to phase values of FIG. 4B, displacement may be calculated using a variation of Equation (1), namely, $$[d=(\text{ØAVG}\cdot\lambda)/(2n)]d=(\emptyset_{AVG}\cdot\lambda)/(4n) \quad (8)$$

to provide time versus displacement as shown in FIG. 4C.

Figure 5:
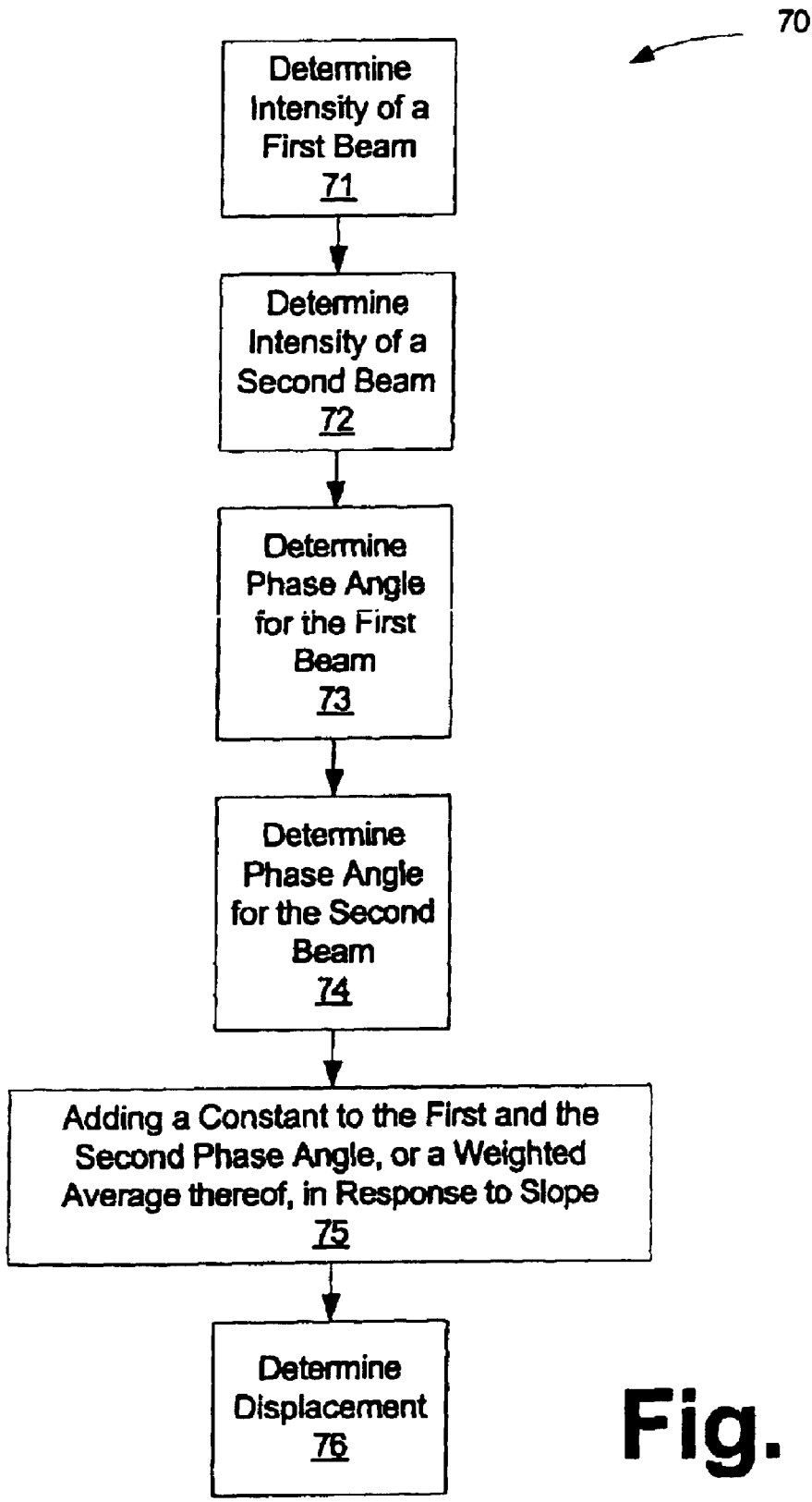
FIG. 5 is a flow diagram of an exemplary embodiment of a program for disc media inspection in accordance with one or more aspects of the present invention.

Referring to FIG. 5, there is shown a flow diagram of an exemplary embodiment of a program 70 for disc media surface inspection in accordance with one or more aspects of the present invention. Information processing system 42 of FIG. 2 may be programmed with program 70 or may be coupled to a network 57, such as a portion of an intranet or the Internet. At step 71, a first intensity is determined for a first beam voltage, such as voltage on signal 43. At step 72, a second intensity is determined for a second beam voltage, such as voltage on signal 44. At step 73, a first phase angle is determined as associated with the first intensity. At step 74, a second phase angle is determined as associated with the second intensity. At step 75, positive and negative values of a constant are added to the first phase angle and the second phase angle, or a weighted average phase angle therefrom. Whether a positive or a negative value of the constant is used is determined in response to phase angle slope, such as slope of the first phase angle, slope of the second phase angle or slope of the weighted average phase angle. At step 76, displacement caused by the disc media surface is deternined.

An embodiment of the present invention is implemented as a program product for use with a information processing system such as, for example, information processing system 42 of FIG. 2. The program(s) of the program product defines functions of the embodiments and can be contained on a variety of signal-bearing media, which include, but are not limited to: (i) information permanently stored on nonwritabie storage media (e.g., read-only memory devices within a computer such as CD-ROM discs readable by a CD-ROM drive); (ii) alterable information stored onmritable storage media (e.g., discs within a floppy drive or hard disc drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

While foregoing is directed to the preferred embodiment of the present invention, other and further embodiments of the invention may be devised without departing from the basic scope thereof, and the scope thereof is determined by the claims that follow.

What is claimed is:

1. An interferometer for disc surface inspection, comprising:
   a laser configured to provide a linearly polarized laser beam;
   a variable ratio beam splitter positioned to receive the linearly polarized laser beam and configured to split the linearly polarized laser beam into a reference beam and an object beam, the reference beam and the object beam being polarized beams with polarizations orthogonal to one another;
   a mirror posItioned to reflect the reference beam back toward the variable ratio beam splitter to provide a reflected reference beam;
   the disc surface positioned to reflect the object beam back toward the variable ratio beam splitter to provide a reflected object beam;
   the variable ratio beam splitter positioned to receive the reflected reference beam and the reflected object beam and configured to combine the reflected reference beam and the reflected object beam to provide a combinative beam;
   a non-polarizing beam splitter positioned to receive the combinative beam and configured to split the combinative beam into a first output beam and a second output beam;
   an adjustable quarter-wave plate positioned to receive the first output beam and configured to introduce a phase shift between the reflected object beam portion of the first output beam and the reflected reference beam portion of the first output beam to provide a phase-shifted output beam;
   a first polarizer positioned to receive the phaseshifted output beam and configured to assemble the reflected obiect beam portion and the reflected reference bea portion of tcomponents of the phase-shifted output beam along a predetermined direction to provide a first assembled beam;
   a second polanzer positioned to receive the second output beam and configured to assemble the reflected obiect beam portion and the reflected referencebeam portion components of the second output beam along the predetermined direction to provide a second assembled beam;
   a first optical detector positioned to receive the first assembled beam and configured to provide a first voltage proportional to change in intensity due to interference of the reflected object beam portion and the reflected reference beam portion of the first assembled beam;
   a second optical detector positioned to receive the second assembled beam and configured to provide a second voltage proportional to change in intensity due to interference of the reflected object beam portion and the reflected reference beam portion of the second assembled beam; and
   an information processingsystem coupled to the first optical detector and the second Wotical detector so as to receive the first voltage and the second voltage and for comparing the first voltage and the second voltage to determine out-of-plane displacements between the mirror and the disc surface as a function of phase change in the output beams.

2. The interferometer of claim 1 wherein the variable ratio beam splitter comprises:
   a half-wave plate configured to receive the linearly polarized laser beam; and
   a polarizing beam splitter configured to receive the linearly polaried laser beam from the half-wave plate.

3. The interferometer of claim 2 wherein the half-wave plate is configured for rotation for balancing relative intensity of the reference beam and of the object beam.

4. The interferometer of claim 1 further comprising a lens positioned to receive the object beam and configured to reduce spot size of the object beam.

5. The interferometer of claim 4 further comprising:
   a first quarter-wave plate positioned to receive the reflected reference beam; and
   a second quarter-wave plate positioned to receive the reflected object beam.

6. The interferometer of claim 1 wherein the phase shift is approximately equal to ninety degrees.

7. The interferometer of claim 1 wherein the information processing system is configured to provide a display output of temporal variations in light intensity in parallel and in phase quadrature of the first assembled beam and the second assembled beam.

8. The interferometer of claim 1 wherein the information processing system is configured to provide a display output of temporal interference fringes formed by temporal phase difference of the first assembled beam and the second assembled beam.

9. The interferometer of claim 1 wherein the information processing system is configured to determine intensity of the first assembled beam and the second assembled beam as a function of phase angle, to unwrap the phase angles and to determine displacement.

10. The interferonmeter of claim 9 wherein the intensity for the first assembled beam is determinable as, $I=I_a+I_b\cos(\emptyset)$, where $\emptyset$ is the phase of the first assembled beam, $I_a=(I_{max}+I_{min})/2$ and $I_b=(I_{max}+I_{min})/2$ where $I_{max}$ and $I_{min}$ are the maximum and minimum intensities of the first assembled beam, wherein the intensity for the second assembled beam is determinable as, $Q=Q_a-Q_b\sin(\emptyset)$, where $\emptyset$ is phase angle of the second assembled beam, $Q_a=(Q_{max}+Q_{min})/2$ and $Q_b=(Q_{max}-Q_{min})/2$ and where $Q_{max}$ and $Q_{min}$ are the maximum and minimum intensities of the second assembled beam, and wherein the phase angle for the first assembled beam for wrapped phase is determinable as, $\emptyset=\cos^{-1}[(I-I_a)/I_b]$ for $Q-Q_a\leq 0$ and $\emptyset=2n-\cos^{-1}[(I-I_a)/I_b]$ for $Q-Q_a>0$, and wherein the phase angle for the second assembled beam for wrapped phase is determinable as, $\emptyset=\sin^{-1}[(Q_a-Q)/Q_b]$ for $I-I_a\geq 0$ and $Q-Q_a\leq 0$, $\emptyset=n-\sin^{-1}[(Q_a-Q)/Q_b]$ for $I-I_a<0$ and $\emptyset=2n+\sin^{-1}[(Q_a-Q)/Q_b]$ for $I-I_a\geq 0$ and $Q-Q_a>0$.

11. The interferometer of claim 10 wherein the processor system is configured to provided a weighted average phase angle of the phase angle of the first assembled beam and the phase angle of the second assembled beam, and wherein the weighted average phase angle is combined with positive and negative values of a constant according to direction of slope to provide a continuous phase function to determine the displacerernt.

12. A method for media surface inspection, comprising:

providing a linearly polarized laser beam;

polarized splitting of the linearly polarized laser beam into a reference beam and an object beam;

reflecting the reference beam from a mirrored surface to provide a reflected reference beam;

reflecting the object beam from the media surfaoe to provide a reflected object beam;

combining the reflected reference beam and the reflected object beam to provide a combinative beam;

amplitude splitting of the combinative beam into a first output beam and a second output beam;

introducing a phase-shift between the reflected object beam portion and the reflected reference beam portion of the first output beam to provide a phase-shifted output beam;

assembling the phaseshifted output beam at an angle to direction of polarization to provide a first assembled beam;

assembling the second output beam at the angle to provide a second assembled beam;

detecting fringes of the first assembled beam to provide a first voltage;

detecting fringes of the second assembled beam to provide a second voltage;

processing the first and second voltaces to determine intensitv of the first assembled beam and the second assemble beam as a function of phase angle, respectively;

using an information processing sytem to unwrap the first and second phase angles; and comparing the unwrapped first and second phase angles to determine beam displacement caused by variations in the disc surface as a functional of phase change in the output beams.

13. The method of claim 12 further comprising:

balancing intensity to provide the reference beam and the object beam;

determining temporal variations in intensity from the first voltage and the second voltage; and displaying in parallel and in quadrature the first assembled beam and the second assembled beam.

14. A signal-bearing medium containing a program which, when executed by a processor in response to inspection of a disc medium surface, causes execution of a method comprising:

determining a first intensity for a first beam voltage;

determining a second intensity for a second beam voltage;

determining a firt phase angle for the first intensity;

determining a second phase angle for the second intensity;

using an information processing system to unwrap the first and second phase angles based upon sinusoidal equations;

determining a weighted average from the first phase angle and the second phase angle;

adding positive and negative values of a constant in response to slope direction of the weighted average to provide a phase function; and determining displacement caused by variations in the disc media surface.

15. The interferometer of claim 1 wherein the predetermined direction is appro)dmately forty-five degrees.

* * * * *